United States Patent
Zhang et al.

(10) Patent No.: US 11,367,122 B2
(45) Date of Patent: *Jun. 21, 2022

(54) SYSTEMS AND METHODS FOR GARMENT SIZE RECOMMENDATION

(71) Applicant: CaaStle, Inc., New York, NY (US)

(72) Inventors: Fujun Zhang, San Ramon, CA (US); Dongming Jiang, Los Angeles, CA (US)

(73) Assignee: CaaStle, Inc., New York, NY (US)

(*) Notice: Subject to any disclaimer, the term of this patent is extended or adjusted under 35 U.S.C. 154(b) by 2 days.

This patent is subject to a terminal disclaimer.

(21) Appl. No.: 17/016,456

(22) Filed: Sep. 10, 2020

(65) Prior Publication Data

US 2021/0342916 A1    Nov. 4, 2021

Related U.S. Application Data

(63) Continuation of application No. 16/862,117, filed on Apr. 29, 2020, now Pat. No. 10,803,509.

(51) Int. Cl.
| | |
|---|---|
| *G06Q 30/00* | (2012.01) |
| *G06Q 30/06* | (2012.01) |
| *G06F 16/9535* | (2019.01) |
| *G06Q 10/08* | (2012.01) |
| *G06N 20/00* | (2019.01) |
| *G06N 5/04* | (2006.01) |
| *G06Q 20/12* | (2012.01) |

(52) U.S. Cl.
CPC ..... *G06Q 30/0631* (2013.01); *G06F 16/9535* (2019.01); *G06N 5/04* (2013.01); *G06N 20/00* (2019.01); *G06Q 10/087* (2013.01); *G06Q 10/0838* (2013.01); *G06Q 30/0627* (2013.01); *G06Q 20/127* (2013.01)

(58) Field of Classification Search
None
See application file for complete search history.

(56) References Cited

U.S. PATENT DOCUMENTS

| | | | |
|---|---|---|---|
| 2015/0134494 A1 | 5/2015 | Su et al. | |
| 2019/0370881 A1 | 12/2019 | Davis | |
| 2021/0342917 A1* | 11/2021 | Parker | G06N 20/00 |

OTHER PUBLICATIONS

Du et al., Automated Fashion Size Normalization, arXiv:1908.09980 v1 [cs.LG] Sep. 20, 2019 (7 pages).

(Continued)

*Primary Examiner* — Mila Airapetian
(74) *Attorney, Agent, or Firm* — Bookoff McAndrews, PLLC

(57) ABSTRACT

Disclosed are methods, systems, and non-transitory computer-readable medium for generating recommendations regarding products. A method may include determining a set of content features including one or more product attributes; determining a set of latent features; receiving a query user identifier and a query product identifier; determining a feature vector associated with the query user identifier and the query product identifier based on the set of content features and the set of latent features; determining one or more model coefficients for a linear model; and utilizing the linear model to determine a fit score for the query user identifier and the query product identifier.

20 Claims, 8 Drawing Sheets

(56) References Cited

OTHER PUBLICATIONS

Zhang et al., GLMix: Generalized Linear Mixed Models For Large-Scale Response Prediction, 22nd SIGKDD Conference on Knowledge Discovery and Data Mining, 2016. (10 pages).
Matrix factorization (recommender systems), Wikipedia, retrieved on Apr. 29, 2020, https://en.wikipedia.org/wiki/Matrix_factorization (recommender systems). (6 pages).
Katelyn Gao, Scalable Estimation and Inference for Massive Linear Mixed Models with Crossed Random Effects. Ph. D Dissertation, Stanford, Jun. 2017 (134 pages).
Eric Colson, Data Science at Stitch Fix, retrieved on Apr. 29, 2020, https://www.datacamp.com/community/blog/data-science-stitch-fix (25 pages).
Bates et al., "Fitting linear mixed-effects models using lme4", Oct. 2015, vol. 67 Issue 1, Journal of Statistical Software (48 pages).
Vazquez et al., "Technical note: An R package for fitting generalized linear mixed models in animal breeding", American Society of Animal Science. 2010; 88(2): pp. 497-504 (8 pages).
McCulloch et al., "Generalized, Linear, and Mixed Models (2nd ed.)", 2008, New York: A Wiley Inter-science Publication. (358 pages).
Stroup et al., "SAS for Mixed Models: introduction and basic applications", 2018, SAS Institute Inc., http://s1.nonlinear.ir/epublish/book/SAS_for_Mixed_Models_1590475003.pdf (42 pages).
Littell et al., "SAS for Mixed Models, Second Edition", 2006, SAS Institute Inc. (834 pages).

\* cited by examiner

SYSTEMS AND METHODS FOR GARMENT SIZE RECOMMENDATION

This application is a continuation of and claims the benefit of priority to U.S. application Ser. No. 16/862,117, filed Apr. 29, 2020, which is incorporated by reference in its entirely herein.

TECHNICAL FIELD

Various embodiments of the present disclosure generally relate to generating recommendations regarding products, and more particularly, recommending garment size for clothing items, for example, in the context of an electronic clothing subscription or other e-commerce platform.

BACKGROUND

Size recommendation has been a concern for the apparel industry since the beginning of online shopping. In a recent study about online clothing purchase, it was reported that about half of returned items were due to a problem with size, e.g., too large or too small. Accordingly, there is a need to improve the success rate of proper fitting products that may be shipped to customers in the context of an electronic clothing subscription or other e-commerce platform.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, systems and methods are disclosed for recommending garment size for clothing items to overcome the problems with conventional methods noted above.

In one embodiment, a computer-implemented method may include: determining a set of content features including one or more product attributes; determining a set of latent features, wherein determining the set of latent features comprises: (1) determining fit ratings for one or more pairs of user identifiers and product identifiers, and (2) deriving the set of latent features based on the determined fit ratings; receiving a query user identifier and a query product identifier; determining a feature vector associated with the query user identifier and the query product identifier based on the set of content features and the set of latent features; determining one or more model coefficients for a linear model, wherein determining the one or more model coefficients comprises: (1) determining one or more fixed effect coefficients, and (2) determining one or more random effect coefficients; and utilizing the linear model to determine a fit score for the query user identifier and the query product identifier based on the determined feature vector and the determined one or more model coefficients. In some embodiments, the linear model may be a Generalized Linear Mixed Model (GLMM).

In another embodiment, a computer system may include: a data storage device storing processor-readable instructions; and a processor configured to execute the instructions to perform a method. The method may include: determining a set of content features including one or more product attributes; determining a set of latent features, wherein determining the set of latent features comprises: (1) determining fit ratings for one or more pairs of user identifiers and product identifiers, and (2) deriving the set of latent features based on the determined fit ratings; receiving a query user identifier and a query product identifier; determining a feature vector associated with the query user identifier and the query product identifier based on the set of content features and the set of latent features; determining one or more model coefficients for a linear model, wherein determining the one or more model coefficients comprises: (1) determining one or more fixed effect coefficients, and (2) determining one or more random effect coefficients; and utilizing the linear model to determine a fit score for the query user identifier and the query product identifier based on the determined feature vector and the determined one or more model coefficients. In some embodiments, the linear model may be a Generalized Linear Mixed Model (GLMM).

In another embodiment, there is provided a non-transitory computer-readable medium containing instructions that, when executed by a processor, cause the processor to perform a method. The method may include: determining a set of content features including one or more product attributes; determining a set of latent features, wherein determining the set of latent features comprises: (1) determining fit ratings for one or more pairs of user identifiers and product identifiers, and (2) deriving the set of latent features based on the determined fit ratings; receiving a query user identifier and a query product identifier; determining a feature vector associated with the query user identifier and the query product identifier based on the set of content features and the set of latent features; determining one or more model coefficients for a linear model, wherein determining the one or more model coefficients comprises: (1) determining one or more fixed effect coefficients, and (2) determining one or more random effect coefficients; and utilizing the linear model to determine a fit score for the query user identifier and the query product identifier based on the determined feature vector and the determined one or more model coefficients. In some embodiments, the linear model may be a Generalized Linear Mixed Model (GLMM).

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
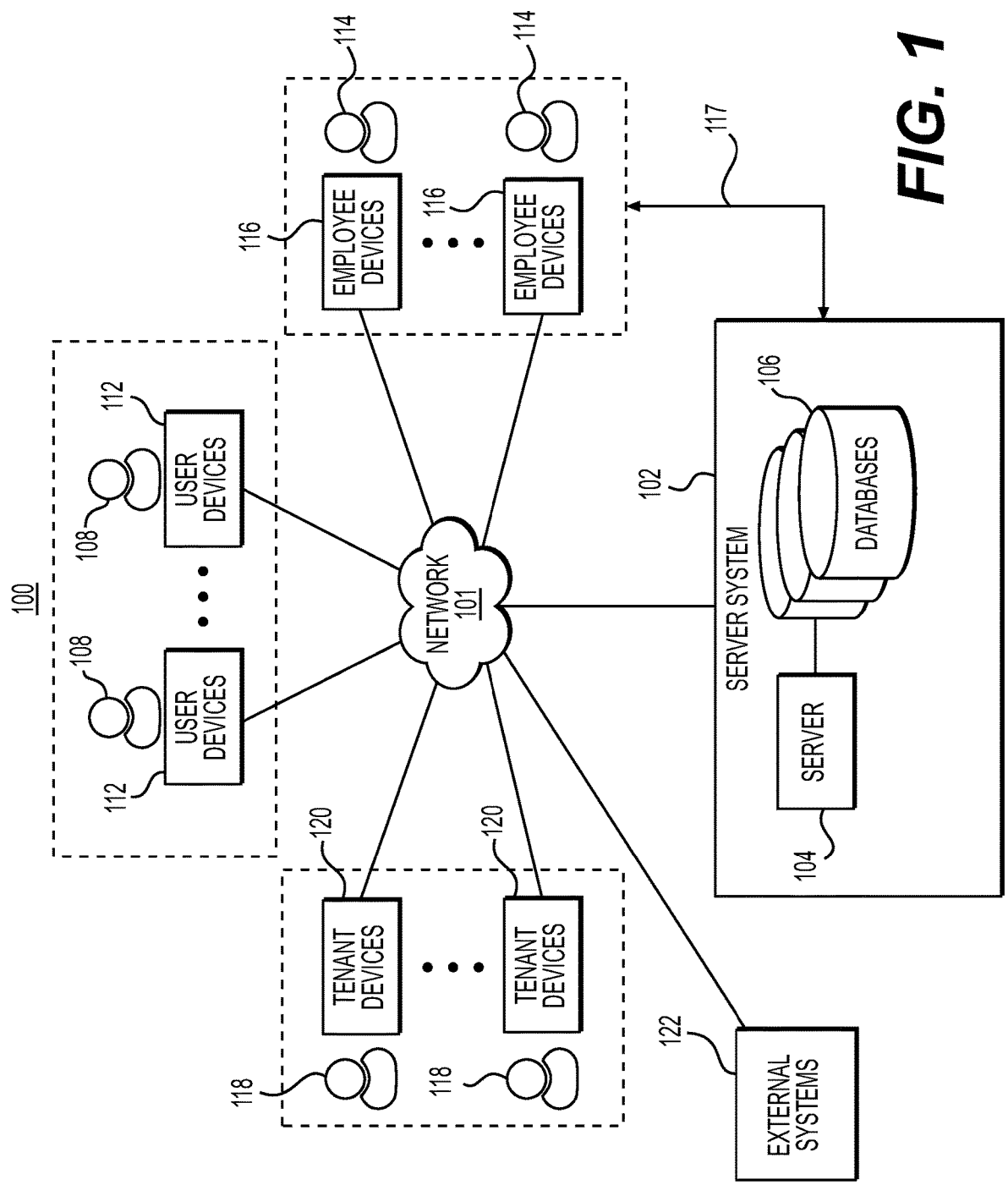
FIG. 1 depicts an example environment in which methods, systems, and other aspects of the present disclosure may be implemented.

As described above, there is a need for an approach to overcome some of the challenges described above in the context of a wearable item subscription service or other e-commerce application.

While the exemplary system architecture as described in the present disclosure relates to an electronic transaction platform for managing, subscribing to, purchasing, or renting wearable items (e.g., clothing-as-a-service (CaaS) or Try-Then-Buy (TTB) service), implementations disclosed herein may effectively serve various other online transaction platforms in the context of any other subscription, purchase, rental, or retail services without departing from the scope of the disclosure. In addition, while some descriptions and examples disclosed in the present disclosure refer to certain exemplary transaction platforms or inventories as transactions or inventories pertaining to "apparel," "garments," or "CaaS" (i.e., clothing-as-a-service), all of those transactions and/or inventories may effectively serve any consumer product or wearable item (e.g., an article of clothing, apparel, jewelry, hat, accessories, or any other product which may be worn), or even hospitality linens, consumer goods, or any other textile fabrics, without departing from the scope of the disclosure.

As used in the present disclosure, the term "CaaS" (i.e., clothing-as-a-service) may collectively refer to computer-implemented services and functions associated with subscription, purchase, and/or rental services for users (e.g., periodic subscription for receiving wearable items, apparel rental or purchase order, distribution, return processing, TTB services, account management, marketing, customer service, warehouse operations, etc.). As used in the present disclosure, the term "wearable item" may refer to any article of clothing, apparel, jewelry, hat, accessories, or other product which may be worn by a person, an animal, or a thing, or be used as an ornament for a person, an animal, or a thing.

In accordance with the present disclosure, user interfaces, periodically executed computer-implemented services, ad hoc services, and automations being integrated together in a connected platform may be achieved by a uniquely configured system architecture, job execution cluster configuring one or more processors to perform both storefront and back office tasks, and various user interfaces providing specialized or customized access to users of different roles. The ordered combination of various ad hoc and automated tasks in the presently disclosed platform necessarily achieve technological improvements through the specific processes described more in detail below. In addition, the unconventional and unique aspects of these specific automation processes represent a sharp contrast to merely providing a well-known or routine environment for performing a manual or mental task.

The subject matter of the present description will now be described more fully hereinafter with reference to the accompanying drawings, which form a part thereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s).

Subject matter can be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

Conventional garment fit modeling may be categorized under the following two approaches: (1) collaborative filtering approach and (2) content based-approach. In some embodiments, a collaborative filtering approach may be based on a user's historical renting and/or sales data. User feedback, e.g., fit or non-fit, for such items may be used to compute user-to-user and item-to-item similarity. Size recommendation may then be determined based on feedback from similar users and/or items. In some embodiments, a content based-approach may determine recommended sizes based on a user's profile (e.g., body measurement data) and/or garment attributes (e.g., garment size charts).

Both collaborative filtering and content-based approaches, however, may have limitations. For example, collaborative filtering approaches may require large datasets based on size feedback provided by active users. Clothing fashion trends may change over time and may be affected by seasonal change, which may result in shift and sparsity of data that the collaborative filtering approach is based on. As another example, content-based approaches may have problems such as vanity sizing, variance of styles and fit characteristics of clothing, and incapable size charts that do not reflect individual garment features.

The current disclosure describes some embodiments directed to utilizing a Generalized Linear Mixed Model (GLMM) that may take advantage of both the collaborative filtering approach and the content-based approach. In some embodiments, a size recommendation model, for example, based on a GLMM, may be used to predict fit probability for any user and garment pair. In some embodiments, content features of users and/or garments and latent features determined based on a collaborative filtering approach may be used as predictive features, as will be described in further detail below. In some embodiments, both fixed effect and random effect variables may be used for the GLMM, as will be described in further detail below.

In some embodiments, local fit patterns from users and garment items may be modeled as a per-user model and a per-item model, respectively, and a global model may be trained to determine fixed effects, as will be described in further detail below. Size recommendation may be performed by combining the aforementioned global model, per-user model and per-item model according to some embodiments. For example, the size recommendation for a garment with multiple sizes may be performed using the GLMM model as disclosed herein by evaluating a fit score for all of the sizes for a user and recommending the size with the best fit, e.g., the highest fit score. The GLMM model as disclosed herein may provide a more robust size recommendation method compared with collaborative filtering and content approaches. For example, the GLMM model as disclosed herein may have unique properties such as linearity and model interpretability.

The embodiments disclosed herein may allow an online rental clothing subscription service to advise appropriate garment size when a user selects clothing items. Such services provided by the online rental clothing subscription service may enhance user experiences in a broader reach of clothing items and allow users to try clothing they have never tried before. The embodiments disclosed herein may ensure service quality and user satisfaction by providing garments of the appropriate size.

Referring now to the appended drawings, FIG. 1 shows an example environment 100, according to one or more embodiments of the present disclosure. As shown, the example environment 100 may include one or more networks 101 that interconnect a server system 102, user devices 112, employee devices 116, tenant devices 120, and external systems 122. The one or more networks 101 may be, for example, one or more of a cellular network, a public land mobile network, a local area network, a wide area network, a metropolitan area network, a telephone network, a private network, an ad hoc network, an intranet, the Internet, a fiber optic based network, a cloud computing network, etc. User devices 112 may be accessed by users 108, employee devices 116 may be accessed by authorized employees 114, and tenant devices 120 may be accessed by employees of tenant entities 118. In some implementations, employee devices 116 may be used to perform the functions of the tenant devices 120 and/or the user devices 112. Server system 102 may comprise one or more servers 104 and one or more databases 106, which may be configured to store and/or process a plurality of data, microservices, and service components, and/or associated functions thereof. In some embodiments, the server system 102 may comprise a machine learning module. The one or more servers 104 may comprise the machine learning module in some embodiments. The machine learning module may comprise one or more neural networks. In some embodiments, the one or more databases 112 may include one or more machine learning libraries.

Users 108 may access the server system 102 through the one or more networks 101 using user devices 112. Each device among the user devices 112 may be any type of computing device (e.g., personal computing device, mobile computing devices, etc.) which allows users 108 to display a web browser or a web based application for accessing the server system 102 through the network 101. The user devices 112 may, for example, be configured to display a web browser, a web based application, or any other user interface (e.g., one or more mobile applications) for allowing users 108 to exchange information with other device(s) or system(s) in the environment 100 over the one or more networks 101. For example, a device among the user devices 110 may load an application with a graphical user interface (GUI), and the application may display on the GUI one or more apparel recommendations for closeting by the user. Users 108 accessing user devices 112 may be, for example, users and/or potential users of apparel made available for subscription based distribution via electronic transactions and physical shipment. Additionally, or alternatively, users 108 may access user devices 112 to, for example, manage one or more user accounts, view catalogs, configure one or more user profiles, engage in customer service communications, make purchase orders, track shipments, generate shipments, monitor order fulfillment processes, initiate or process returns, order apparel for purchase, provide feedback, refer other users, navigate through various features such as size advisor, perform personalized discovery, and/or make recommendations.

Employee devices 116 may be configured to be accessed by one or more employees 114, including, for example, customer service employees, marketer employees, warehouse employees, analytics employees, or any other employees who are authorized and/or authenticated to perform tasks, operations, and/or transactions associated with the server system 102, and/or the external systems 122. In one embodiment, employee devices 116 are owned and operated by the same entity or at least an affiliate of the entity operating the e-commerce (e.g., CaaS) business hosted on server systems 102. Each device among the employee devices 116 may be any type of computing device (e.g., personal computing device, mobile computing devices, etc.). The employee devices 116 may allow employees 114 to display a web browser or an application for accessing the server system 102 and/or the external systems 122, through the one or more networks 101. For example, a device among the one or more of the employee devices 116 may load an application with graphical user interface (GUI), and the application may display on the GUI one or more warehouse operations associated with providing CaaS to users 108. In some implementations, the employee devices 116 may communicate directly with the server system 102 via communications link 117 bypassing public networks 101. Additionally, or alternatively, the employee devices 116 may communicate with the server system 102 via network 101 (e.g., access by web browsers or web based applications).

Tenant devices 120 may be configured to be accessed by one or more tenants 118. Each device among the tenant devices 120 may be any type of computing device (e.g., personal computing device, mobile computing devices, etc.). As used herein, each tenant, among one or more tenants 118, may refer to an entity that allocates and/or supplies one or more specific collections of apparel for the CaaS inventory. For example, each of the one or more tenants 118 may be a retailer, a designer, a manufacturer, a merchandiser, or a brand owner entity that supplies one or more collections of wearable items to the CaaS inventory managed and/or accessed by the server system 102. Tenants 118 may use one or more electronic tenant interfaces (e.g., a catalog content management system associated with each tenant) to provide the server system 102 with wearable item data that describe apparel or wearable items made available for electronic transactions on server system 102. For example, one or more catalogs for each of the one or more tenants 118 may be generated and/or updated at the server system 102 dynamically and/or periodically. Tenant devices 120 may serve as access terminals for the tenants 118, for communicating with the electronic tenant interfaces and/or other subsystems hosted at the server system 102. The tenant devices 120 may, for example, be configured to display a web browser, an application, or any other user interface for allowing tenants 118 to load the electronic tenant interfaces and/or exchange data with other device(s) or system(s) in the environment 100 over the one or more networks 101.

External systems 122 may be, for example, one or more third party and/or auxiliary systems that integrate and/or communicate with the server system 102 in performing various CaaS tasks. External systems 122 may be in communication with other device(s) or system(s) in the environment 100 over the one or more networks 101. For example, external systems 122 may communicate with the server system 102 via API (application programming interface) access over the one or more networks 101, and also communicate with the employee devices 116 via web browser access over the one or more networks 101. In some embodiments, the external systems 122 may comprise one or more servers and one or more databases, which may be configured to store and/or process a plurality of data, microservices, and service components, and/or associated functions thereof. In some embodiments, the external system may comprise a machine learning module. The one or more servers may comprise the machine learning module in some embodiments. The machine learning module may comprise one or more neural networks. In some embodiments, the one or more databases may include one or more machine learning libraries.

As indicated above, FIG. 1 is provided merely as an example. Other examples that differ from the example environment 100 of FIG. 1 are contemplated within the scope of the present embodiments. In addition, the number and arrangement of devices and networks shown in environment 100 are provided as an example. In practice, there may be additional devices, fewer devices and/or networks, different devices and/or networks, or differently arranged devices and/or networks than those shown in environment 100. Furthermore, two or more devices shown in FIG. 1 may be implemented within a single device, or a single device shown in FIG. 1 may be implemented as multiple, distributed devices. Additionally, or alternatively, one or more devices may perform one or more functions of other devices in the example environment 100. For example, employee devices 116 may be configured to perform one or more functions of tenant devices 120, in addition to their own functions.

Figure 2:
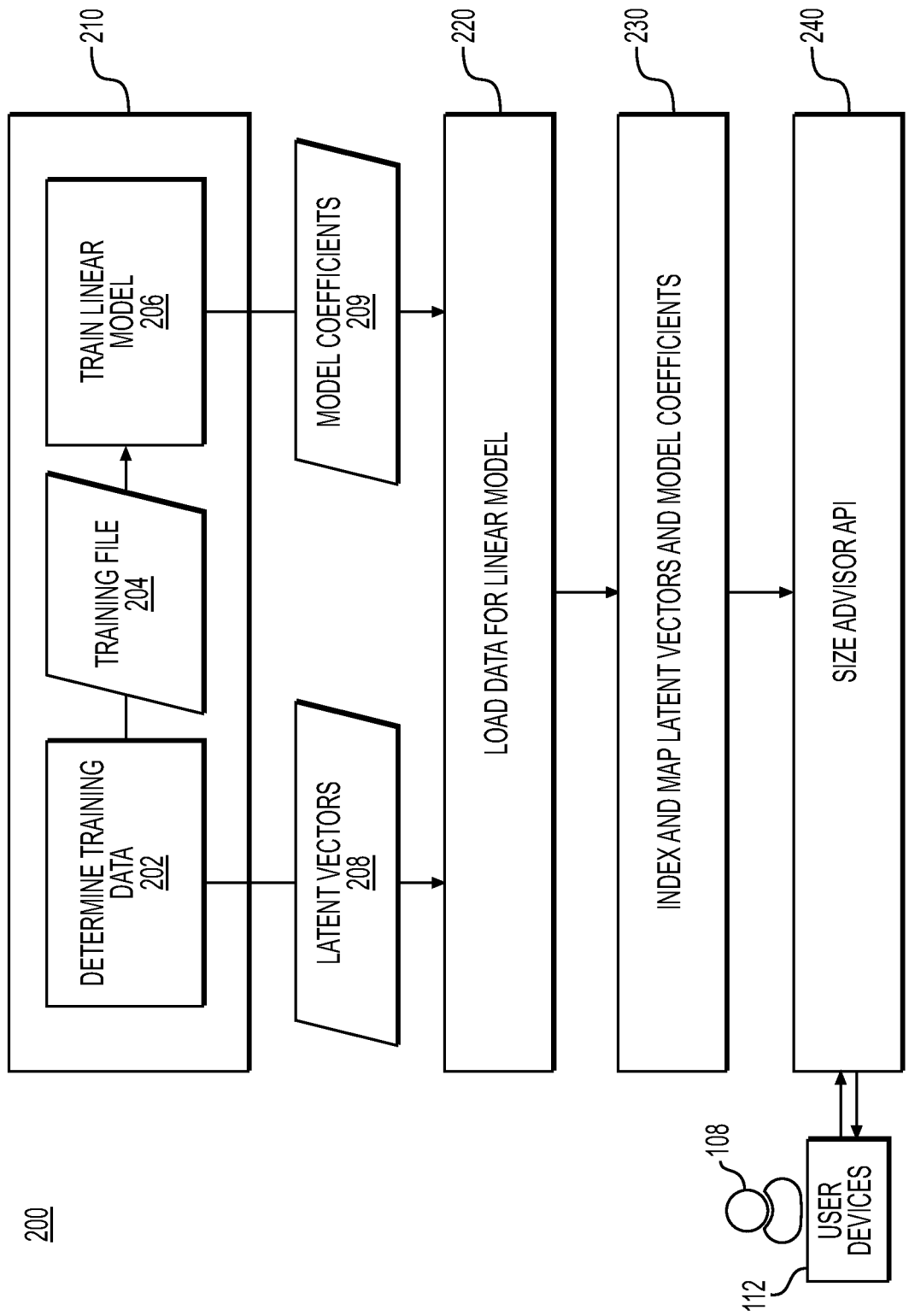
FIG. 2 depicts an exemplary method associated with a size recommendation model, according to some embodiments.

FIG. 2 depicts an exemplary method 200 associated with a size recommendation model, according to some embodiments. As shown in FIG. 2, the method 200 may begin with step 202 in which training data may be determined. In some embodiments, the training data may be determined based on user fit feedback, as will be described in further detail below with reference to FIG. 3. In some embodiments, the training data may be compiled as a training file 204. In step 206, a linear model may be trained based on the training file 204. In some embodiments, the linear model may be a Generalized Linear Mixed Model (GLMM) configured to score the fitting probability of all candidate sizes for any product in which a user is interested, as will be described in further detail below. In step 220, data may be loaded for the linear model. In some embodiments, loading data for the linear model may include obtaining one or more latent vectors based on the determined training data in step 202. In some embodiments, loading data for the linear model may include obtaining model coefficients 209 based on the trained linear model from step 206. In step 230, the one or more latent vectors and model coefficients may be indexed and mapped, as will be described in further detail below with reference to FIGS. 4A and 4B. In step 240, a size advisory API may be utilized to determine a fit score regarding a user and garment pair in response to a user request sent by a user 108 via a user device 112. For example, the user may access content including information regarding a product. In such instances, a request including identifiers for the user and the product, e.g., unique user identifier (UUID) and stock keeping unit (SKU), may be transmitted via the size advisory API. In the context of the current disclosure, the SKU may include attributes associated with the product that may distinguish it from other products. For example, such attributes may include manufacturer, description, material, size, color, packaging, etc. Fit scores may be determined for the available sizes for the product of the user and product pair and a recommended size for the product may be determined for the user, as will be described in further detail below with reference to FIGS. 5 and 6.

Figure 3:
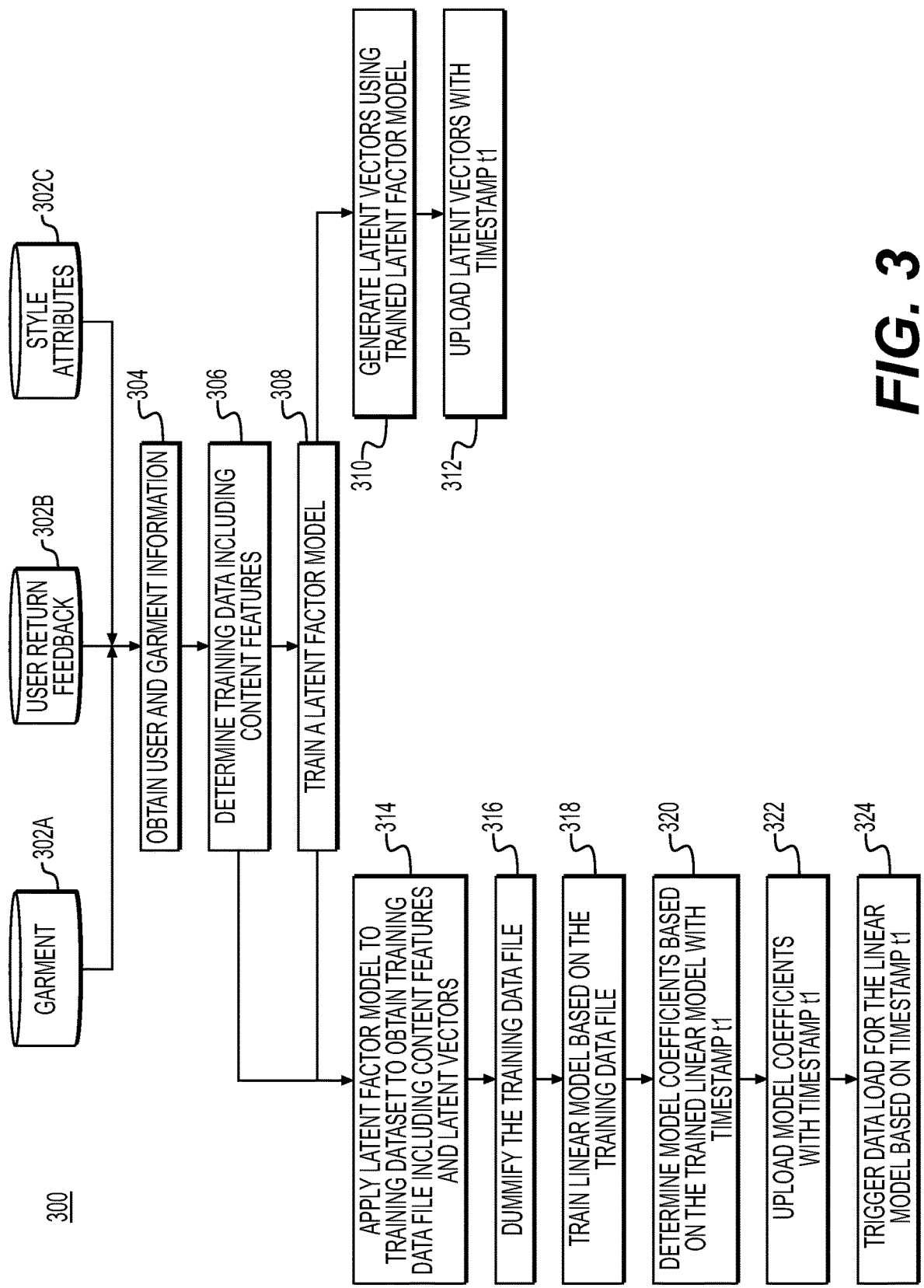
FIG. 3 depicts an exemplary method for data setup and model training, according to some embodiments.

FIG. 3 depicts an exemplary method 300 for data setup and model training according to some embodiments.

As shown in FIG. 3, method 300 may begin with step 304 in which information regarding one or more users and one or more products, e.g., returned products, may be obtained. In some embodiments, an index may be determined based on the obtained information for the one or more users and products. In some embodiments, the information may include garment information 302A, user return feedback 302B, and/or style attributes 302C. For example, historically collected garment attributes/properties, user profile, and/or fit feedback may be obtained. In some embodiments, content features may be extracted from the obtained information. For example, content features may include product brand, product type, product material(s) (e.g., main material used for product), product hemline length, product sleeve length, product silhouette (e.g., a dress silhouette or skirt silhouette), product vendor size, etc.

In step 306, a training data set including the content features may be generated. In step 308, a latent factor model, e.g., an SVD++ model, may be trained based on the training data set. In step 310, one or more latent vectors may be generated based on the trained latent factor model. In the context of the current disclosure, a latent vector may be referred to as a set of one more latent features. In some embodiments, a latent feature may be derived from a fit value, for example, obtained in step 304. For example, the following Table 1 depicts fit ratings mapped to associated fit values. For example, a "great fit" and an "okay fit" may be assigned a fit value of 1 and a "did not fit" may be assigned a fit value of 0.

TABLE 1

| Fit Rating  | Fit Value |
|-------------|-----------|
| Great Fit   | 1         |
| Okay Fit    | 1         |
| Did Not Fit | 0         |

The fit values may be used as an input to derive a latent feature. For example, using unique user identifiers as rows and product identifiers (SKUs) as columns (n rows and m columns are depicted in Table 2 below, where n and m may be any number corresponding to the number of users and products, respectively), each cell associated with a user identifier and a product identifier may be filled with a corresponding fit values based on the user and product information obtained in step 304. In Table 2 below, 1 may indicate a fit (e.g., a great fit or an okay fit) and 0 may indicate a non-fit (e.g., did not fit).

TABLE 2

|         | SKU-1 | SKU-2 | SKU-3 | SKU-4 | SKU-5 | SKU-6 | ... | SKU-m |
|---------|-------|-------|-------|-------|-------|-------|-----|-------|
| UUID-1  | 1     |       | 0     |       | 1     |       |     |       |
| UUID-2  |       | 1     |       |       | 1     |       |     | 0     |
| UUID-3  | 0     |       |       | 1     |       | 1     |     |       |
| UUID-4  |       | 1     |       |       |       |       |     | 1     |
| ...     |       |       |       |       |       |       |     |       |
| UUID-n  | 1     |       | 1     |       | 0     |       |     | 1     |

In some embodiments, a latent feature may be generated based on a matrix such as the one depicted above in Table 2. Based on the provided inputs based on the obtained user and product information, a matrix factorization algorithm, such as SVD++, may be utilized to predict each entry. In the context of the current disclosure, the latent factor model may utilize such matrix factorization algorithms. The predicted output for each entry of the matrix, e.g., values for Table 2, may be used as latent features. Accordingly, a value of the latent feature may be determined for each user and product pair, e.g., UUID and SKU pair.

In step 312, the generated latent features may be uploaded, e.g., to server system 102 and/or a cloud storage service, with a timestamp t1. In the context of the current disclosure, the timestamp t1 may indicate a point in time. In some embodiments, timestamp t1 may indicate the most recent time, for example, that the latent features had been generated.

In step 314, the latent factor model may be applied to the training dataset. In some embodiments, a training data file, e.g., a CSV file, may be obtained based on the latent factor model. For example, the latent factor model may be applied to the training dataset to generate one or more latent vectors. In such instances, the generated one or more latent vectors may be combined with content features from the training data set to determine the training data file. Accordingly, the training data file may include content features and latent vectors. The training data file may be assigned a time stamp t1 that indicates the point in time in which the training data file has been determined.

In step 316, values for the training data file may be dummified. In the context of the current disclosure, the term "dummified" may refer to one or more methods of expanding a categorical feature to multiple binary features. For example, a categorical feature named "fit" may have two possible values: fit and non-fit. When the categorical feature "fit" is dummified, two columns may be generated: "fit" and "non-fit." When a particular size of a product fits a user, the "fit" may be set as TRUE while "non-fit" may be set as FALSE, and vice versa. In some embodiments, the "fit" may be set of FALSE while the "non-fit" may be set as TRUE for the remaining sizes associated with the product and the user.

In step 318, the linear model may be trained based on the training data file. In some embodiments, the linear model may be trained on a machine learning platform. The training data file may be transformed into a format that may be required by the machine learning platform. For example, the training data file may initially be in a CSV format which may be transformed to a libsvm format. In such instances, fixed and random effects may be included in the transformed data file and labeled. The libsvm format may then be transformed to an Apache Avro format. In some embodiments, the formatting above may be implemented via python and/or any appropriate coding language.

In some embodiments, the linear model may be a GLMM model configured to capture a user's personal fit on items, the item's specific fitting property, as well as the global fit pattern across users and garment items. In some embodiments, GLMM may belong to a parametric model. That is, the GLMM may not only generate predictive output, but also infer insights from the data. GLMM may be an extension of a linear mixed model (LMM). For example, the distribution of the response variable in the GLMM may belong to an exponential family which may include normal distribution, binomial distribution, etc. In the embodiments disclosed herein, the response may be modeled as binary, e.g., fit or non-fit. It is understood, however, that the modeled response may vary in alternative embodiments. In some embodiments, GLMM may be implemented using SAS and/or R data analysis software. Other models, e.g., including other parametric models and/or non-parametric models including deep learning, may be utilized in some embodiments.

In some embodiments, GLMM may include crossed random effects, e.g., users and items. An exemplary GLMM model may be provided as follows: $Y_{ij}=x_{ij}^T\beta+a_i+b_j+e_{ij}$, where $x_{ij} \in R^p$, $a_i \stackrel{iid}{\sim}(0, \sigma_A^2)$, $b_j \stackrel{iid}{\sim}(0, \sigma_B^2)$, $e_{ij} \stackrel{iid}{\sim}(0, \sigma_E^2)$, where $Y_{ij}$ may indicate whether a garment item j may be a fit for a user i; $x_{ij}$ (also referred to as fixed effects) may be a vector of features; $\beta$ may be a coefficient vector; $a_i$ may capture variations from the user i while $b_j$ may capture variations from the garment item j. In some embodiments, fixed effect $x_{ij}$ may include both content and latent features. In some embodiments, both $a_i$ and $b_j$ may be random effect. In some embodiments, variations from the user may include various body measurements and/or sex of each different user.

In step 320, model coefficients may be determined based on the trained linear model. For example, model coefficients may include the fixed and random coefficients of the trained linear model. In step 322, the model coefficients may be uploaded to server system 102 and/or a cloud storage service with timestamp t1. In step 324, data load for the linear model may be triggered based on the timestamp t1. That is, the data with timestamp t1, e.g., model coefficients with timestamp t1 uploaded in step 322 and/or latent vectors with timestamp t1 uploaded in step 312, may be loaded for the linear model.

Figures 4A, 4B:
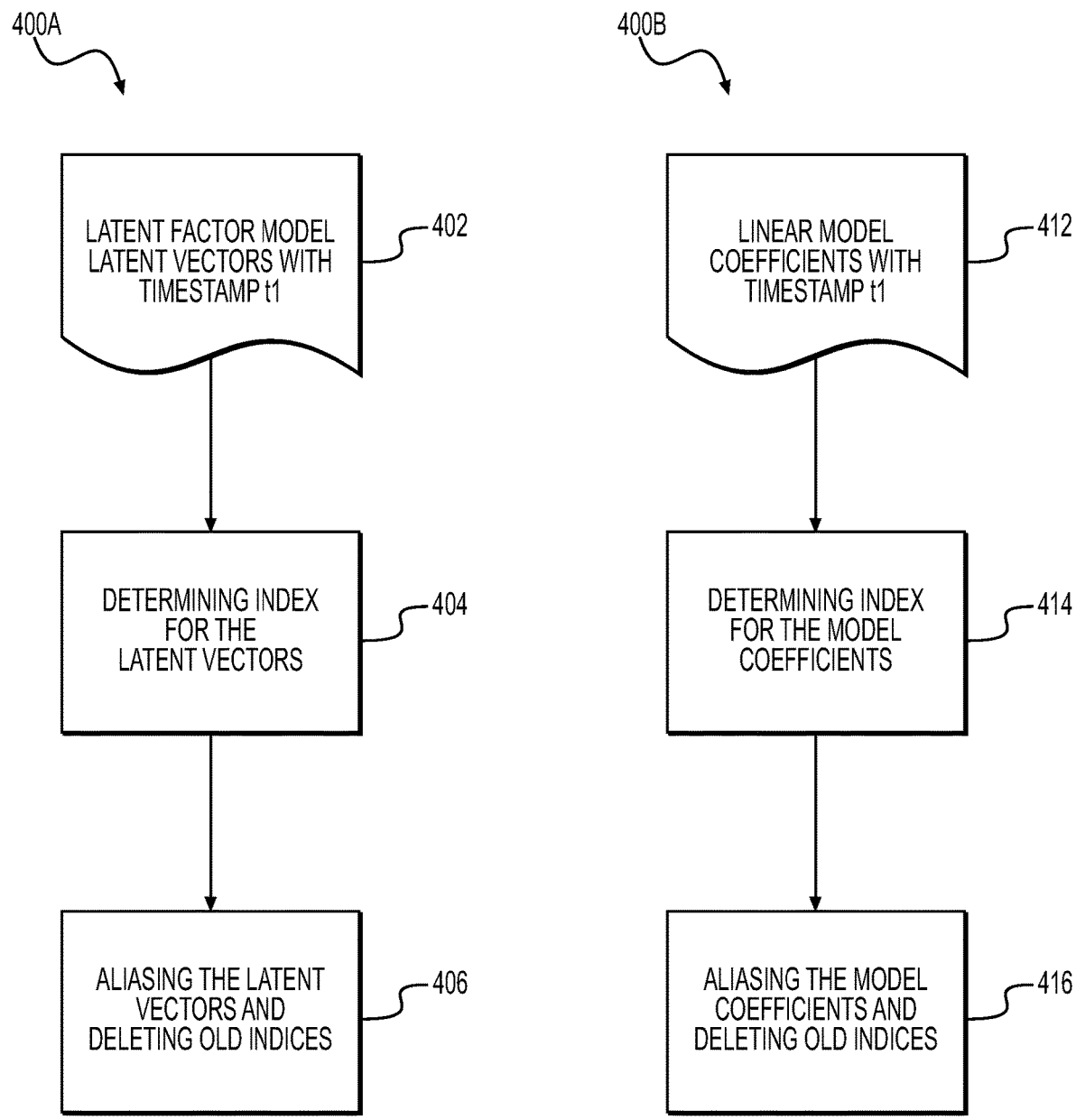
FIG. 4A depicts a method for indexing latent vectors, according to some embodiments.
FIG. 4B depicts a method for indexing linear model coefficients according to some embodiments.

FIG. 4A depicts a method 400A for indexing latent vectors according to some embodiments. As shown in FIG. 4A, latent vectors, described above with reference to FIGS. 2 and 3, may be obtained in step 402. In some embodiments, the latent vectors may be assigned the timestamp t1 that may indicate that the latent vectors are the most recently generated. In step 404, an index may be determined for the obtained latent vectors. In some embodiments, each document included in the index may be based on a user and/or product, e.g., UUID and/or SKU. In some embodiments, the latent vectors may be indexed to an elastic search. In step 406, the obtained latent vectors may be aliased and existing indices (e.g., existing latent vectors) may be deleted. In the context of the current disclosure, aliasing may refer to an exemplary implementation method of replacing an existing data set with a new data set using a same pointer. For example, in step 406, when the new latent vector is obtained (e.g., in step 402) a pointer that pointed to an existing latent vector may be aliased to point to the new (obtained) latent vector so that the pointer is pointing to the most recect latent vector at any given point in time. After the pointer has been aliased, i.e., points to the obtained latent vector, the existing latent vector may be removed. In some embodiments, the pointer may be utilized on the electronic transaction platform. In such embodiments, the step of aliasing (step 406) may allow the platform to utilize an existing pointer to point to a new latent vector while keeping the rest of the platform intact.

FIG. 4B depicts a method 400B for indexing linear model coefficients according to some embodiments. As shown in FIG. 4B, model coefficients, described above with reference to FIGS. 2 and 3, may be obtained in step 412. In some embodiments, the latent vectors may be assigned the timestamp that may indicate that the model coefficients are the most recently generated. In step 414, an index may be determined for the obtained model coefficients. In some embodiments, the index may include the fixed and random coefficients of the trained linear model. For example, the index may include a document for fixed effect coefficients at a global level and a document per user for random effect coefficients. In some embodiments, the model coefficients may be indexed to an elastic search. In step 416, the obtained model coefficients may be aliased and existing indices (e.g., existing model coefficients) may be deleted. As explained above, aliasing may refer to an exemplary implementation method of replacing an existing data set with a new data set using a same pointer. For example, in step 416, when the new model coefficient is obtained (e.g., in step 412) a pointer that pointed to an existing model coefficient may be aliased to point to the new (obtained) model coefficient so that the pointer is pointing to the most recect model coefficient at any given point in time. After the pointer has been aliased, i.e., points to the obtained model coefficient, the existing model coefficient may be removed. In some embodiments, the pointer may be utilized on the electronic transaction platform. In such embodiments, the step of aliasing (step 416) may allow the platform to utilize an existing pointer to point to a new model coefficient while keeping the rest of the platform intact.

The generated indices, e.g., the indices for the latent vectors and/or the model coefficients, may be used to predict a fit score for a user and garment pair, as will be described in further detail below. In some embodiments, the aliasing of model coefficients index and latent vectors index may be an atomic operation. That is, the timestamp of the aliased model coefficient and latent feature indices should be the same.

Figure 5:
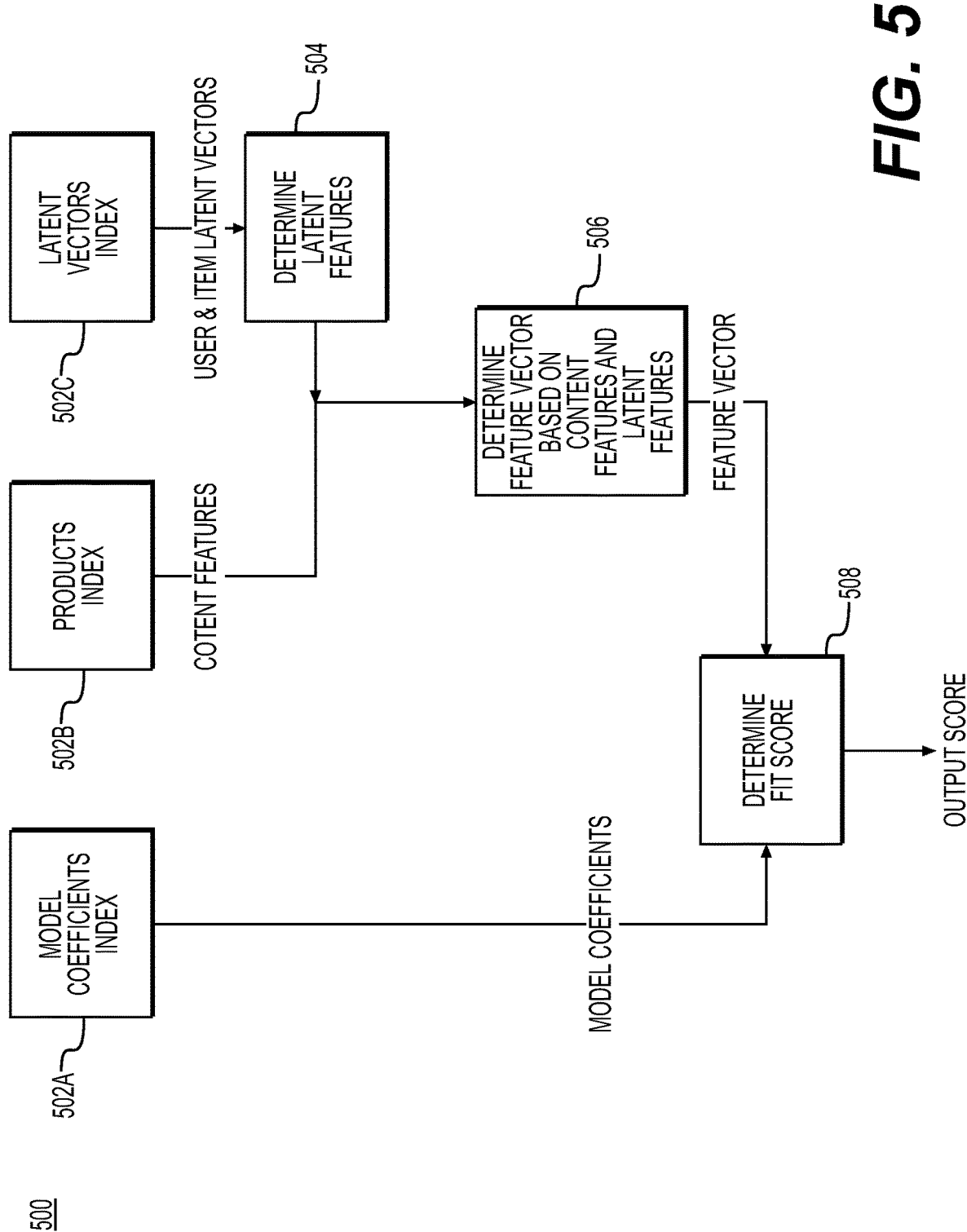
FIG. 5 depicts an exemplary method of determining a fit score, according to some embodiments.

FIG. 5 depicts an exemplary method 500 of determining a fit score according to some embodiments. For example, a fit score for a user and garment pair, e.g., UUID and SKU, may be determined as follows. As shown in FIG. 5, latent vectors associated with the UUID and SKU may be obtained from the latent vectors index 502C. In step 504, latent features associated with the UUID and SKU may be determined based on the obtained latent vectors. In some embodiments, the latent features for the UUID and SKU pair may be determined by computing a dot product of the UUID latent vector and the SKU latent vector. Content features associated with the SKU may also be obtained from the products index 502B. For example, content features may include brand, product type, main material, hemline length, sleeve length, dress silhouette, skirt silhouette, pant silhouette, vendor size, etc.

In step 506, a feature vector for the UUID and SKU pair may be determined based on the obtained content features and the determined latent features. In some embodiments, a feature vector may be determined by concatenating and sorting the latent features determined in step 504 and the content features from the products index 502. An exemplary feature vector for the UUID and SKU pair may include: ("London Times", "Dress", "Polyester", "Knee", "Cap", "Fit and Flare", "Not Applicable", "1×", "0.678543"). It is understood that the feature vector may be in varying formats and determined based on any combination of the obtained content features and the determined latent features in other embodiments.

In step 508, a fit score may be determined for the UUID and SKU pair. As shown in FIG. 5, model coefficients associated with the UUID and SKU pair may be obtained from the model coefficients index 502A. For example, the obtained model coefficients may include the fixed effect coefficients and user specific random effect coefficients. Accordingly, the fit score may be determined based on the model coefficients and the determined feature vector. In some embodiments, the fit score may be calculated as follows: Fit score=(feature vector*fixed effects coefficients)+(feature vector*random effects coefficients)+intercepts. In such embodiments, the intercepts may refer to values where a line crosses the axes with reference to the linear model as disclosed herein. In other embodiments, the fit score may be calculated as follows: Fit score=Σ(feature vector*fixed effects coefficients)+Σ(feature vector*per-user coefficients)+Σ(feature vector*per-item coefficients). In some embodiments, the determined fit score may be output to a user or utilized otherwise as will described in further detail below with reference to FIG. 6.

Figure 6:
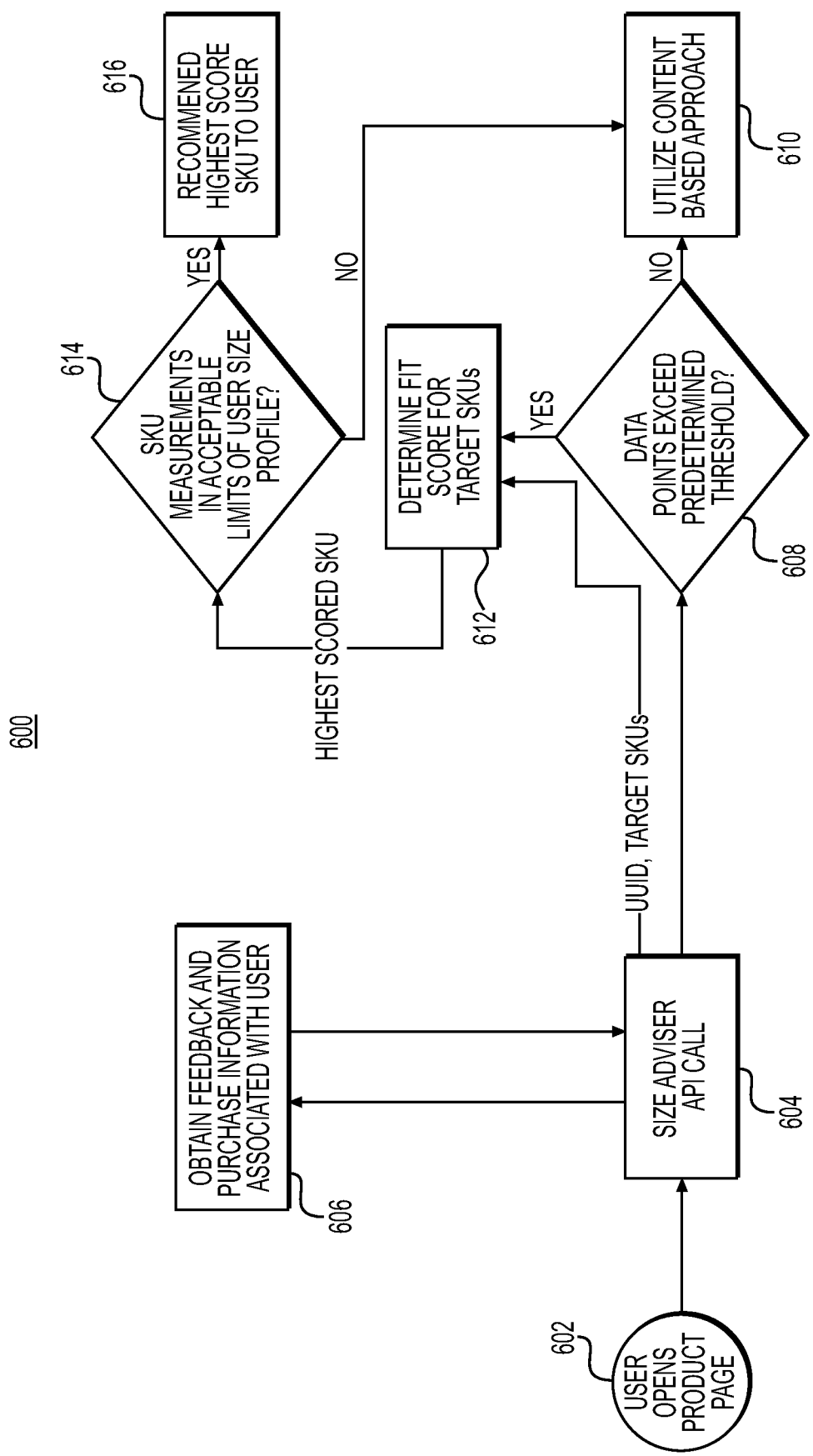
FIG. 6 depicts an exemplary method of a size advisor API flow for recommending a size for a product, according to some embodiments.

FIG. 6 depicts an exemplary method 600 of a size advisor API flow for recommending a size for a product according to some embodiments. As shown in FIG. 6, a user may access a product page 602, e.g., of the electronics transactions page. In such instances, a size advisor request may trigger a size adviser API call 604. In some embodiments, the size advisor request may include a UUID associated with the user and SKUs included, e.g., depicted, in the product page (hereinafter referred to as target SKUs). Subsequently, feedback and purchase information associated with the user may be obtained to determine training data, as described above with reference to FIGS. 2 and 3. In some embodiments, the obtained feedback and purchase information may include a certain number of data points. For example, there may be a certain number of instances in which the user had previously provided feedback and/or purchased (or rented) a product, such as a previously shipped product. In step 608, the number of data points may be aggregated and compared with a predetermined threshold. For example, the predetermined threshold may be five. If the number of data points do not exceed the predetermined threshold, then the size recommendation may be determined based on the content based approach 610. For example, the recommended SKU may be determined based on the user's profile (e.g., body measurement data) and/or garment attributes (e.g., garment size charts). In some embodiments, such predetermined thresholds may be utilized to control the products and users used in the modeling and prediction processes, e.g., associated with determining the fit score in step 612. The use of such predetermined thresholds may eliminate noise from the data and helps to more precisely target the user and product population.

If the number of data points do exceed the predetermined threshold, the fit score for each of the target SKUs may be determined in step 612, as described above with reference to FIG. 5. In step 614, the measurement of the target SKU with the highest fit score may be compared with a range of acceptable measurements for the user based on his or her user profile. For example, the target SKU with the highest fit score may be a large, and the user profile may accept measurements between a large and an extra-large. In this example, the target SKU may be deemed acceptable to recommend to the user. Accordingly, the target SKU with the highest fit score may be recommended to the user in step 616. If the measurement of the target SKU with the highest fit score does not fall in the range of acceptable measurements for the user, the recommended SKU may be determined based on the content based approach 610.

Figure 7:
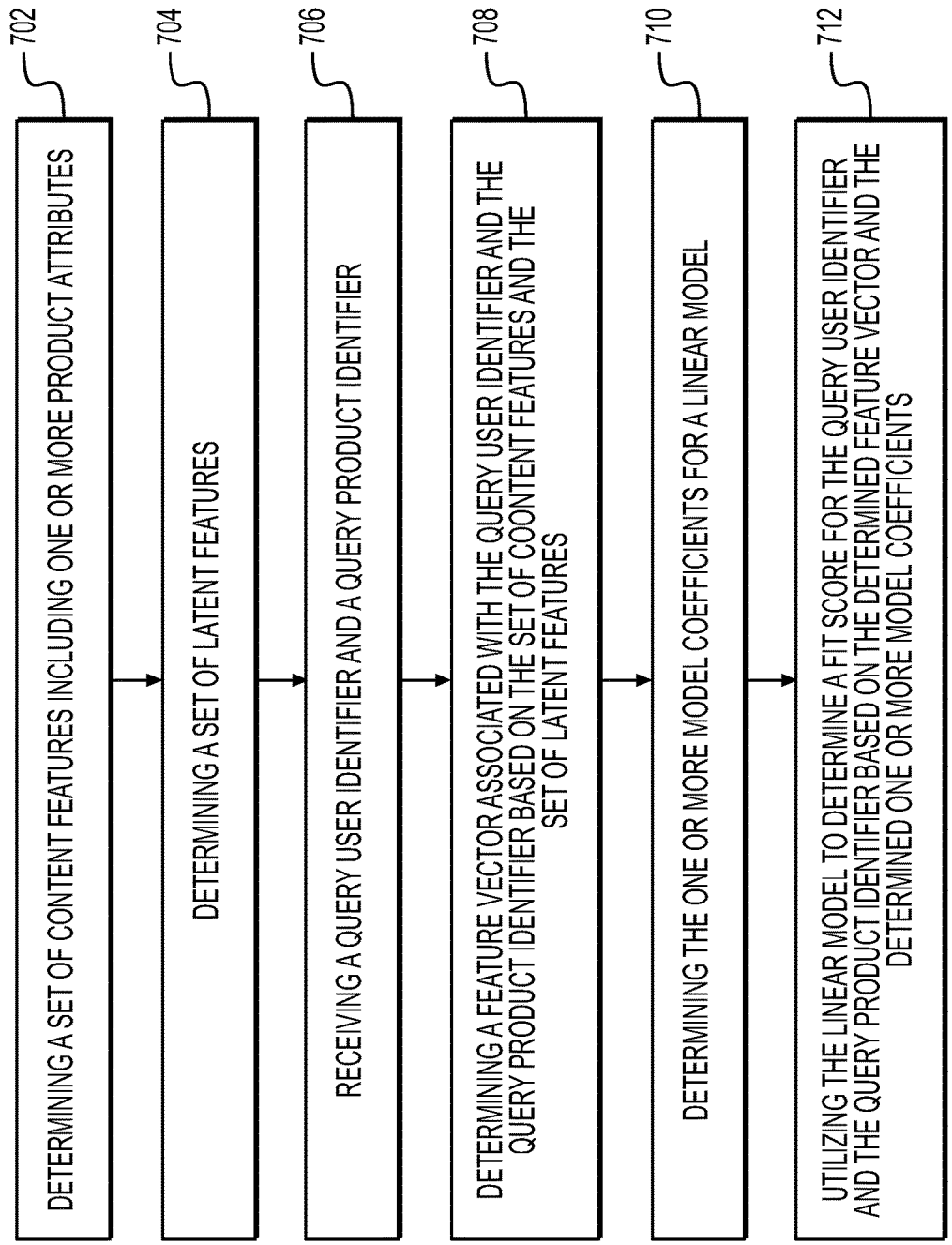
FIG. 7 depicts an exemplary method according to some embodiments.

FIG. 7 depicts an exemplary method 700, according to some embodiments. The method 700 may being with step 702, in which a set of content features including one or more product attributes may be determined. In some embodiments, determining the set of content features may include determining the set of content features based on the determined training data set. In step 704, a set of latent features may be determined. In some embodiments, determining the set of latent features may include: (1) determining fit ratings for one or more pairs of user identifiers and product identifiers, and (2) deriving the set of latent features based on the determined fit ratings. In some embodiments, determining the set of latent features may include determining the set of latent features based on the determined training data set. In some embodiments, determining the set of latent features may include obtaining one or more fit ratings associated with the one or more pairs of user identifiers and product identifiers from the determined training data set; determining an absence of a fit rating for a particular user identifier and a particular product identifier; and determining the fit rating for the particular user identifier and product identifier as negative as a result of determining the absence of the fit rating for the particular pair user identifier and product identifier.

In step 706, a query user identifier and a query product identifier may be received. In step 708, a feature vector associated with the query user identifier and the query product identifier may be determined based on the set of content features and the set of latent features. In step 710, one or more model coefficients may be determined for a linear model. In some embodiments, determining the one or more model coefficients for the linear model may include: (1) determining one or more fixed effect coefficients, and (2) determining one or more random effect coefficients. In some embodiments, the one or more random effect coefficients may be based on variations of a user associated with the query user identifier and a product associated with the query product identifier. In step 712, the linear model may be utilized to determine a fit score for the query user identifier and the query product identifier based on the determined feature vector and the determined one or more model coefficients.

In some embodiments, method 700 may include a further step in which a training data set comprising one or more historical data attributes of previously shipped products may be determined. In some embodiments, each of the historical data attributes is associated with a user identifier and a product identifier used in an electronic transactions platform. In some embodiments, the linear model may be trained based on the determined training data set. In some embodiments, the linear model may be a generalized linear mixed model (GLMM).

In some embodiments, method 700 may include a further step in which the determined fit score for the query user identifier and the query product identifier may be compared with another fit score associated with a different user identifier and a different product identifier. In some embodiments, the query user identifier and product identifier or the different user identifier and product identifier may be transmitted based on the comparison.

Figure 8:
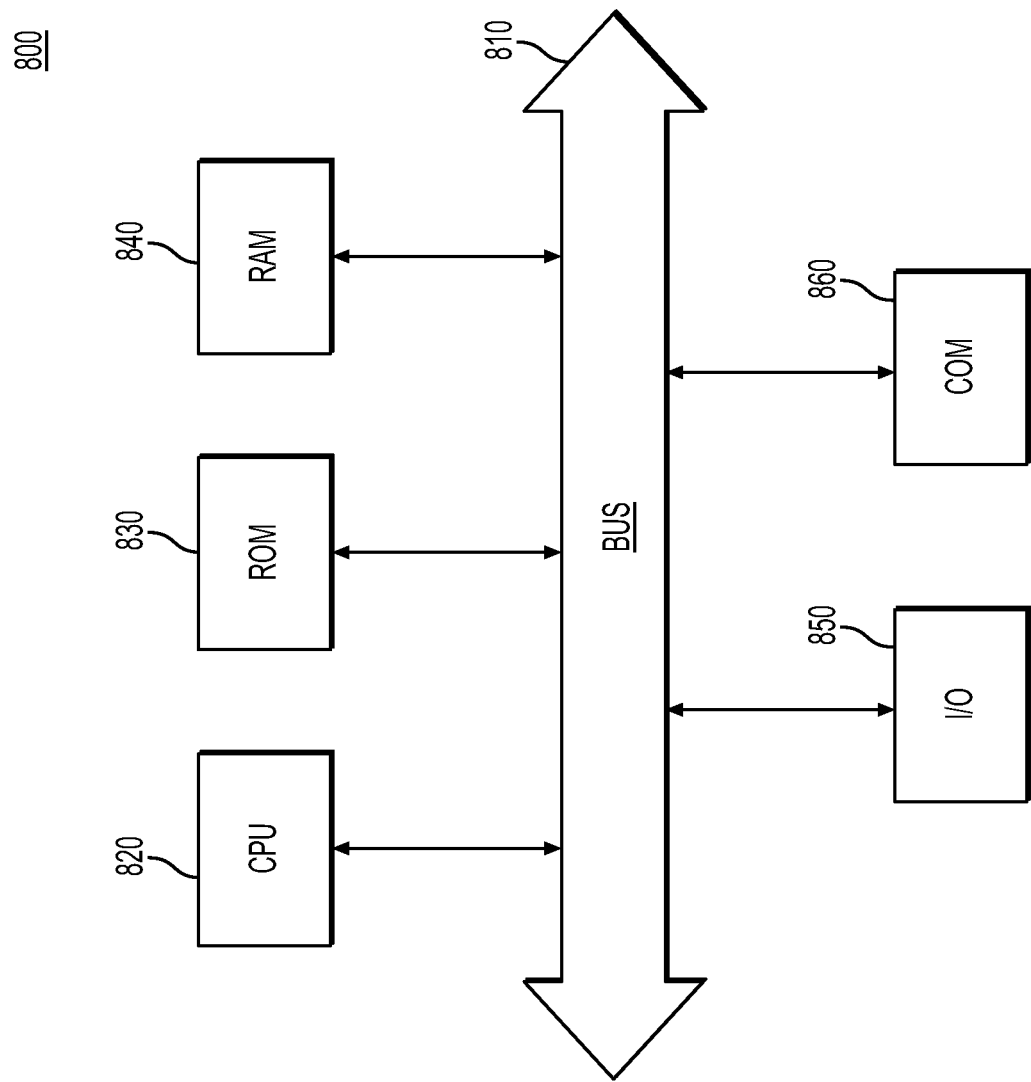
FIG. 8 depicts an exemplary computer device or system, in which embodiments of the present disclosure, or portions thereof, may be implemented.

As shown in FIG. 8, a device 800 used for performing the various embodiments of the present disclosure (e.g., the server system 102, the user devices 112, the employee devices 116, the tenant devices 120, and/or any other computer system or user terminal for performing the various embodiments of the present disclosure) may include a central processing unit (CPU) 820. In some embodiments, the CPU 820 may be a graphics processing unit (GPU), a tensor processing unit (TPU), etc. CPU 820 may be any type of processor device including, for example, any type of special purpose or a general-purpose microprocessor device. As will be appreciated by persons skilled in the relevant art, CPU 820 also may be a single processor in a multi-core/multiprocessor system, such system operating alone, or in a cluster of computing devices operating in a cluster or server farm. CPU 820 may be connected to a data communication infrastructure 810, for example, a bus, message queue, network, or multi-core message-passing scheme.

A device 800 (e.g., the server system 102, the user devices 112, the employee devices 116, the tenant devices 120, and/or any other computer system or user terminal for performing the various embodiments of the present disclosure) may also include a main memory 840, for example, random access memory (RAM), and may also include a secondary memory 830. Secondary memory, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc., which is read by and written to by the removable storage drive. As will be appreciated by persons skilled in the relevant art, such a removable storage unit generally includes a computer usable storage medium having stored therein computer software and/or data.

In alternative implementations, secondary memory 830 may include other similar means for allowing computer programs or other instructions to be loaded into device 800. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to device 800.

A device 800 may also include a communications interface ("COM") 860. Communications interface 860 allows software and data to be transferred between device 800 and external devices. Communications interface 860 may include a modem, a network interface (such as an Ethernet card), a communications port, a PCMCIA slot and card, or the like. Software and data transferred via communications interface may be in the form of signals, which may be electronic, electromagnetic, optical, or other signals capable of being received by communications interface 860. These signals may be provided to communications interface 860 via a communications path of device 800, which may be implemented using, for example, wire or cable, fiber optics, a phone line, a cellular phone link, an RF link or other communications channels.

The hardware elements, operating systems, and programming languages of such equipment are conventional in nature, and it is presumed that those skilled in the art are adequately familiar therewith. A device 800 also may include input and output ports 850 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems, or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and include a wide variety of electronic information, including executable code; content such as text, video data, and audio data, among others; and various codes or flags. The terms "information," "data," and "content" are sometimes used interchangeably when permitted by context.

It is intended that the specification and examples be considered as exemplary only, with a true scope and spirit of the disclosure being indicated by the following claims.

What is claimed is:

1. A computer-implemented method comprising:
   determining a first set of features including one or more product attributes of a product selected for a user;
   determining a second set of features based on fit ratings for one or more pairs of user identifiers and product identifiers associated with the user;
   receiving a query user identifier and a query product identifier associated with the user;
   determining a parameterized model associated with the query user identifier and the query product identifier based on the first set of features and the second set of features; and
   using the parameterized model to determine a fit score for the query user identifier and the query product identifier.

2. The computer-implemented method of claim 1, further comprising:
   determining a training data set comprising one or more historical data attributes of previously shipped products, wherein each of the historical data attributes is associated with a user identifier and a product identifier used in an electronic transactions platform.

3. The computer-implemented method of claim 2, wherein determining the first set of features comprises determining the first set of features based on the determined training data set, and
   wherein determining the second set of features comprises determining the second set of features based on the determined training data set.

4. The computer-implemented method of claim 2, further comprising:
   training the parameterized model based on the determined training data set, wherein the parameterized model is a generalized linear mixed model (GLMM).

5. The computer-implemented method of claim 2, wherein determining the second set of features further comprises:
   obtaining one or more fit ratings associated with the one or more pairs of user identifiers and product identifiers from the determined training data set;
   determining an absence of a fit rating for a particular user identifier and a particular product identifier; and
   as a result of determining the absence of the fit rating for the particular pair user identifier and product identifier, determining the fit rating for the particular user identifier and product identifier as negative.

6. The computer-implemented method of claim 1, wherein determining the parameterized model comprises:

determining (1) one or more fixed effect coefficients, and (2) one or more random effect coefficients, wherein the one or more random effect coefficients are based on variations of a user associated with the query user identifier and a product associated with the query product identifier.

7. The computer-implemented method of claim 1, further comprising:
comparing the determined fit score for the query user identifier and the query product identifier with another fit score associated with a different user identifier and a different product identifier; and
transmitting the query user identifier and product identifier or the different user identifier and product identifier based on the comparison.

8. A computer system comprising:
a data storage device storing processor-readable instructions; and
a processor configured to execute the instructions to perform a method including:
determining a first set of features including one or more product attributes of a product selected for a user;
determining a second set of features based on fit ratings for one or more pairs of user identifiers and product identifiers associated with the user;
receiving a query user identifier and a query product identifier associated with the user;
determining a parameterized model associated with the query user identifier and the query product identifier based on the first set of features and the second set of features; and
using the parameterized model to determine a fit score for the query user identifier and the query product identifier.

9. The computer system of claim 8, the method further comprising:
determining a training data set comprising one or more historical data attributes of previously shipped products, wherein each of the historical data attributes is associated with a user identifier and a product identifier used in an electronic transactions platform.

10. The computer system of claim 9, wherein determining the first set of features comprises determining the first set of features based on the determined training data set, and
wherein determining the second set of features comprises determining the second set of features based on the determined training data set.

11. The computer system of claim 9, the method further comprising:
training the parameterized model based on the determined training data set, wherein the parameterized model is a generalized linear mixed model (GLMM).

12. The computer system of claim 9, wherein determining the second set of features further comprises:
obtaining one or more fit ratings associated with the one or more pairs of user identifiers and product identifiers from the determined training data set;
determining an absence of a fit rating for a particular user identifier and a particular product identifier; and
as a result of determining the absence of the fit rating for the particular pair user identifier and product identifier, determining the fit rating for the particular user identifier and product identifier as negative.

13. The computer system of claim 8, wherein determining the parameterized model comprises:
determining (1) one or more fixed effect coefficients, and (2) one or more random effect coefficients, wherein the one or more random effect coefficients are based on variations of a user associated with the query user identifier and a product associated with the query product identifier.

14. The computer system of claim 8, the method further comprising:
comparing the determined fit score for the query user identifier and the query product identifier with another fit score associated with a different user identifier and a different product identifier; and
transmitting the query user identifier and product identifier or the different user identifier and product identifier based on the comparison.

15. A non-transitory computer-readable medium containing instructions that, when executed by a processor, cause the processor to perform a method comprising:
determining a first set of features including one or more product attributes of a product selected for a user;
determining a second set of features based on fit ratings for one or more pairs of user identifiers and product identifiers associated with the user;
receiving a query user identifier and a query product identifier associated with the user;
determining a parameterized model associated with the query user identifier and the query product identifier based on the first set of features and the second set of features; and
using the parameterized model to determine a fit score for the query user identifier and the query product identifier.

16. The non-transitory computer-readable medium of claim 15, the method further comprising:
determining a training data set comprising one or more historical data attributes of previously shipped products, wherein each of the historical data attributes is associated with a user identifier and a product identifier used in an electronic transactions platform.

17. The non-transitory computer-readable medium of claim 16, wherein determining the first set of features comprises determining the first set of features based on the determined training data set, and
wherein determining the second set of features comprises determining the second set of features based on the determined training data set.

18. The non-transitory computer-readable medium of claim 16, the method further comprising:
training the parameterized model based on the determined training data set, wherein the parameterized model is a generalized linear mixed model (GLMM),
wherein determining the second set of features further comprises:
obtaining one or more fit ratings associated with the one or more pairs of user identifiers and product identifiers from the determined training data set;
determining an absence of a fit rating for a particular user identifier and a particular product identifier; and
as a result of determining the absence of the fit rating for the particular pair user identifier and product identifier, determining the fit rating for the particular user identifier and product identifier as negative.

19. The non-transitory computer-readable medium of claim 15, wherein determining the parameterized model comprises:
determining: (1) one or more fixed effect coefficients, and (2) one or more random effect coefficients, wherein the one or more random effect coefficients are based on variations of a user associated with the query user identifier and a product associated with the query product identifier.

20. The non-transitory computer-readable medium of claim 15, the method further comprising:

comparing the determined fit score for the query user identifier and the query product identifier with another fit score associated with a different user identifier and a different product identifier; and transmitting the query user identifier and product identifier or the different user identifier and product identifier based on the comparison.

\* \* \* \* \*